Dec. 27, 1938.       H. L. STRUBE       2,141,320
VIBRATING SCREEN SPRING
Filed Aug. 8, 1936            2 Sheets-Sheet 1
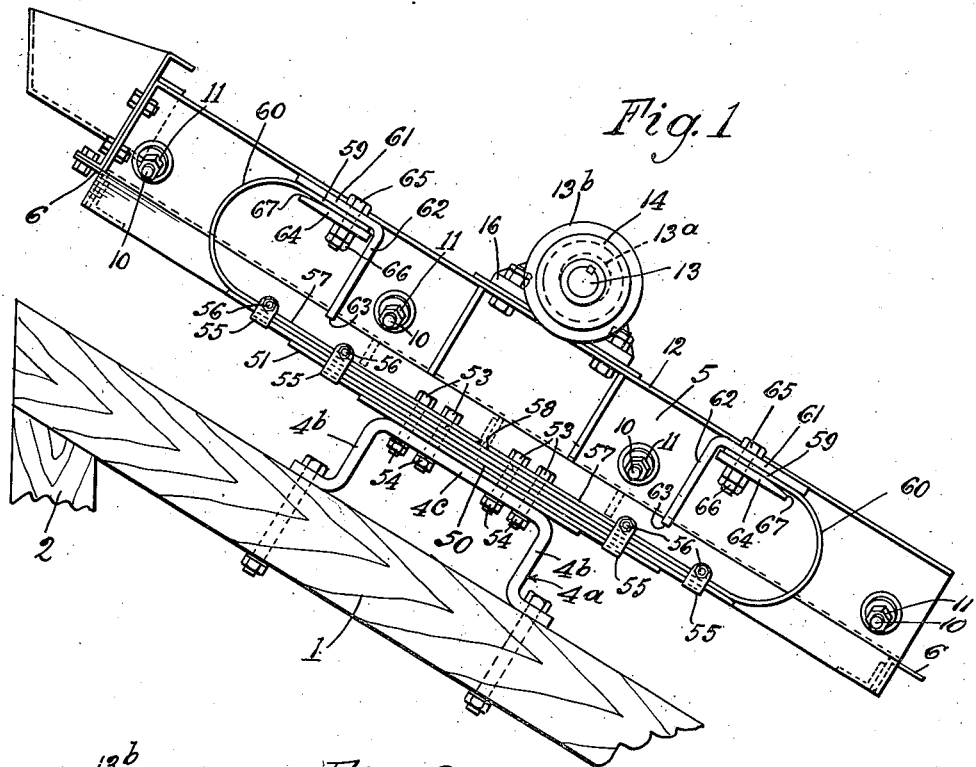
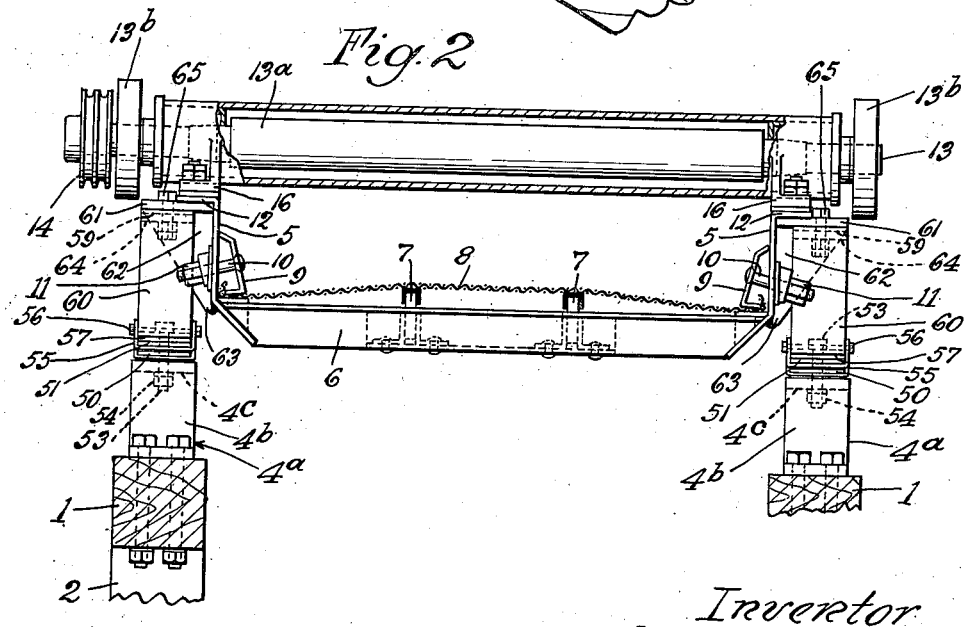
Inventor
Harry L. Strube
by Parker & Carter
Attorneys.

Dec. 27, 1938.   H. L. STRUBE   2,141,320
VIBRATING SCREEN SPRING
Filed Aug. 8, 1936   2 Sheets-Sheet 2

Inventor
Harry L. Strube
by Parker + Carter
Attorneys.

Patented Dec. 27, 1938

2,141,320

UNITED STATES PATENT OFFICE 2,141,320

VIBRATING SCREEN SPRING

Harry L. Strube, Philadelphia, Pa., assignor to Link-Belt Company, Chicago, Ill., a corporation of Illinois Application August 8, 1936, Serial No. 94,951

3 Claims. (Cl. 209—415)

This invention relates to an improvement in vibrating screens, and has for one purpose the provision of improved means for supporting such screens.

Another purpose is the provision of improved spring or yielding supporting means for the screen frame.

Another object is the provision of yielding supporting means which shall permit a vibrating of the screen frame, vertically and along a longitudinally extended plane.

Another purpose is the provision of improved flexible supporting means interposed between the screen frame and its supporting base, adapted to permit or guide vibration of the screen, while limiting to a minimum the power required for said vibration.

Another purpose is the elimination of dead spots or areas in the screen.

Another purpose is the prevention of the vibration and power absorbing effect inherent in such flexible screen supporting means as spirally coiled springs.

Other objects will appear from time to time in the course of the specification and claims.

My invention is illustrated more or less diagrammatically in the accompanying drawings, wherein:

Figure 1 is a side elevation;

Figure 2 is an end view, with parts broken away and parts in section;

Like parts are indicated by like symbols throughout the specification and drawings.

Figure 3:
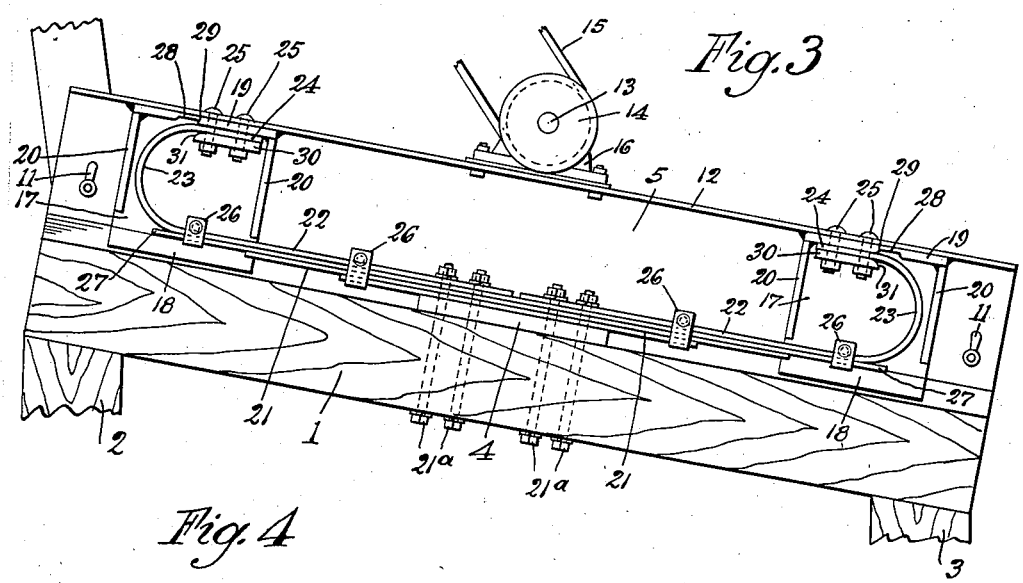
Figure 3 is a side elevation of a variant form.

Referring to the drawings, 1 generally indicates a side of a base frame member which may be of any suitable material, but is here indicated as of wood. It may be supported on any suitable end support herein shown as 2 and 3.

Obviously the screen may be mounted in any sort of support or on any foundation, and the members 1, 2 and 3 here serve as suggestions merely of one form of support for the screen. The invention is not limited to this or to any other support nor to the details of construction shown, and any material desirable may be used.

A block 4 may be positioned between each of the horizontal members 1 and the screen, as shown in Figure 3, or the metallic brackets 4a, as shown in Figures 1 and 2, may be employed, which include upstanding spacing members 4b, which space the horizontal portion 4c from the structural or base member.

In the particular form here shown the screen proper comprises side frame members 5 which may be joined by any suitable cross members, if desired, and which are shown as spaced and secured by transverse frame members 6. One or more members 7 may be supported upon or attached to the members 6. The screen cloth 8 rests upon these members. Removable clamping plates 9 are secured by bolts 10 and nuts 11, or otherwise, and hold the screen cloth in place. The side members 5 are preferably provided with flanges 12 which extend outwardly.

Secured to and preferably mounted upon the upper edge of the side members 5, for example upon the flanges 12, is an out-of-balance rotor 13 which carries a pulley 14 and may be driven by a belt or other means 15. The invention is not limited to the particular form of vibratory means shown and that which appears in Figures 1 and 2 appears only as an illustration of the fact that vibratory means are provided.

I may for example employ a rotor which includes an eccentric longitudinally extending body portion 13a. Associated with the eccentric I may also employ additional eccentrics or counterweights 13b which may be adjustable about the axis of rotation of the rotor and may be employed either to accentuate the unbalanced effect of the portion 13a, or partially to balance it whereby, as to each screen and for each problem, the vibration of the particular screen may be adjusted accurately in relation to the spring supporting means employed therefor. The vibratory means may be provided with brackets 16 for attachment to the flange 12 or may be otherwise attached.

Referring to Figures 1 and 2, I secure to the horizontal portion of the bracket 4c a leaf spring member generally indicated as 50 which includes a plurality of generally horizontal leaf members 51, of varying lengths, held together and to the bracket portion 4c for example by bolts 53 with their lock nuts 54. 55 indicates surrounding holders or clips with securing bolts 56, adapted to hold the individual leaf members firmly together, while permitting sufficient flexure of the spring as a whole to enable it to perform its function.

The upper leaf 57, shown as separated in two parts as at 58, has ends 59 at the ends of arcuate or bowed portions 60. The reversely extending end portions 59 engage and support brackets which include an upper portion 61 and a side portion 62, both of which may be welded or otherwise secured to the screen side frame member 5. Preferably the lower end of the member 62 extends slightly below the edge of the side member, say at 63. A clamp plate 64 may be employed to clamp the parts together, being held in position as by the bolt 65 and its nuts 66. It is somewhat beveled or cut away as at 67 to permit the screen assembly to vibrate without cramping the spring, and to prevent the spring from being contacted by a sharp edge.

In the form shown in Figures 3 to 6, inclusive, a supporting member is provided, attached to the screen and arranged to receive the ends of the spring. This member comprises a side plate 17 with an inwardly and downwardly bent flange 18 and an outwardly and laterally bent portion 19, which portion is generally of the same size as the flange 12. Secured to the side plate 17, and also to the portion 19 are brackets 20. The plate 17 and brackets 20 thus form in effect a partially enclosing housing for the spring ends.

Figure 4:
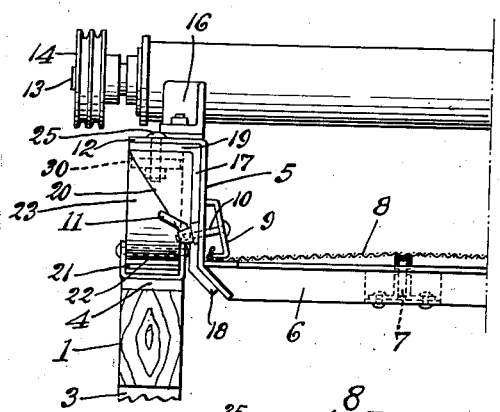
Figure 4 is a partial end view of said form.
Figure 5:
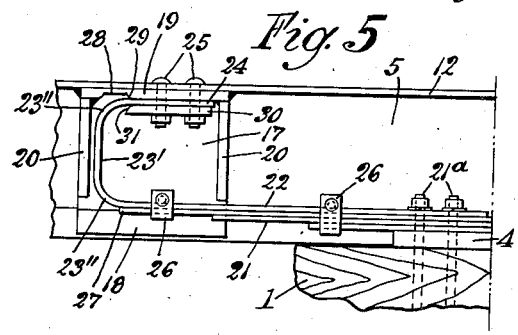
Figure 5 is a partial side view of another variant form.

In the form of the device shown generally in Figures 3 to 5, inclusive, a leaf spring 21 is provided. This spring rests upon the block 4 and is secured by bolts 21a or otherwise. The upper leaf of the spring assembly comprises a member or members 22, provided with return curved portions 23 which are flattened at their ends as at 24, bear upon the sections 19 of the plates 17 and are secured in place by bolts 25 or otherwise. Retaining members 26 may be mounted on the spring at suitable intervals. The ends of the spring leaves adjacent the leaves 22 may extend outwardly as at 27. This is not an essential feature but may be embodied and has the advantage of reinforcing the spring section 22 at the outer end of the spring. It may, of course, be omitted. The sections 19 may be provided with depressions or recesses 28 at the point where the curved section 23 ends. This is done so that the spring at the point of its movement shall not be in contact with a sharp edge. The depression 28 is made and the edge 29 is rounded. A securing plate 30 is positioned adjacent the flat section 24 of the spring 22 and it is provided with a curved edge 31 which serves the same purpose as the curved portion 29. The nuts and bolts engage not the spring section 24 but the upper face of the flange 19 and the lower face of the plate 30.

The form of the invention shown in Figure 5 differs from that shown in Figures 3 and 4 only in the fact that instead of the more or less semi-circular curved portion 23, there is provided a generally straight portion 23' and two shorter curved portions 23". In other words, the device of Figure 5 differs from that of Figure 3 by the shape of the curve of the upper spring leaf or member.

Figure 6:
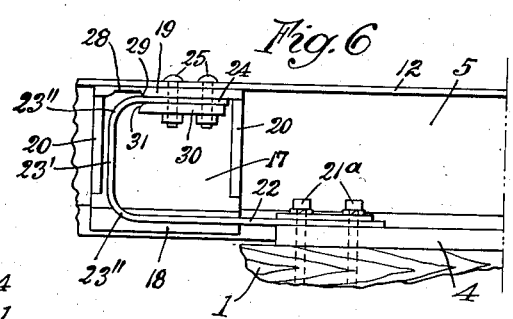
Figure 6 is a partial side view of another variant form.
Figure 8:
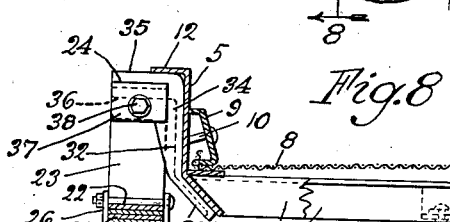
Figure 8 is a section on the line 8—8 of Figure 7.

In the form of Figure 6 the upper spring leaf is the same as that shown in Figure 5 but instead of being mounted upon a leaf or other spring it is mounted directly upon the base member 4 so that it is secured to a fixed base instead of being secured to a moving base or spring. When the form of the device shown in Figure 6 is used, the spring may be given any desired length. It may be shorter or longer. As shown, although it conforms in shape to the upper spring member of Figure 5, it is somewhat shorter.

Figure 7:
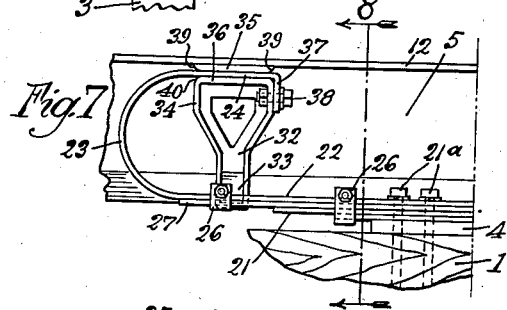
Figure 7 is a partial side view of yet another variant form.

In the form of the device shown in Figure 7, the spring arrangement is generally the same as that shown in Figures 3 and 4 except for the means by which the end of the spring member 22 is secured to the screen section. A bracket member 32 is secured to the side member 5 of the screen by bolts, by welding or otherwise. As shown it comprises a downwardly depending portion 33 which corresponds in shape to the shape of the screen frame and it comprises an upper enlarged portion 34 which is split to provide a top section 35 and a lower section 36. Within the slot or groove formed between these two sections the upper portion 24 of the spring 22 is received. The spring is provided additionally with a downwardly bent end 37 which fits against the rear of the bracket and is held in place by one or more bolts 38. It will be noticed that the ends of the upper section 35 are curved as at 39 and that the corresponding or oppositely placed edges of the lower section 36 are curved as at 40 so that the spring in its flexure is in contact with rounded surfaces rather than with angular surfaces which might damage it.

It will be realized that whereas I have described and illustrated a practical and operative device, nevertheless many changes may be made in the size, shape, number and disposition of parts without departing from the spirit of my invention. I therefore wish my description and drawings to be taken as in a broad sense illustrative or diagrammatic rather than as limiting me to the precise showing.

The use and operation of this invention are as follows:

The screen may be assembled generally as shown in the various forms illustrated herewith. It may be positioned horizontally or at an angle to the horizontal. When the out-of-balance rotor or other vibratory means is put in motion, the screen as a whole vibrates. The leaf springs are flexible and permit movement of the screen as a whole. The connection of the leaf springs to the screen frame is by the flexible member 23, for example, as shown in Figures 3 and 7, which is a curved extension to the upper spring leaf and is flexible and is itself a spring. The applicant has thus provided in addition to the spring mounting, which comprises the leaf springs, a spring or yielding connection between the ends of the leaf spring and the screen frame. In the particular form this comprises an extension of the spring, but it might be a separate yielding member which does not structurally form a part of one of the spring leaves. The construction shown, therefore, provides in addition to the yielding effect of the leaf spring itself a further yielding and movement permitted by the flexible connection, whether that connection comprises a portion of the spring, a portion of the leaf of a spring, or an entirely additional member.

In the form shown in Figure 5, the flexible connection 23' operates generally the same as the flexible connection 23 of Figures 3 and 7. A somewhat different shape is given to the spring. Otherwise its operation is generally the same and it permits a movement and a yielding additional to that permitted by the leaf springs alone.

In the form shown in Figure 6, there is no multiple leaf spring. The single member 22 comprises the spring and it is, in a sense, a single leaf or cantilever spring. The flexible section 23' is the same as that shown in Figure 5 and carries out the same function, namely, that of permitting a movement in addition to that permitted by the generally flat portion 22, In whatever form the device appears, it preferably comprises a generally elongated spring member and a flexible yielding or spring connection between the end of that member and the screen. In the preferred form this flexible connection comprises what may be generally called a U-shaped spring member. This has the important advantage of providing a sharp, quick reaction as the screen is vibrated. In the particular form shown in Figures 5 and 6, the portion 23' is shown as rectilinear, and generally perpendicular to the portions 22 and 24.

Under some circumstances I may even omit the upper arm 24 of the member shown in Figures 5 and 6, although I find the structure shown in those figures practical and satisfactory. I have determined from experience that spring structures such as those herein shown and described are, in their sharpness and quickness of reaction and in their general efficiency, much superior to some of the other connecting means, such as rubber blocks, or spiral or coil springs. The shock absorbing or damping action of a spiral spring is a sharp contrast to the snap and sharp, quick action of the springs herein described and claimed. The result is a very substantial increase in screening efficiency and capacity, which I have observed in actual use.

For most purposes the multiple leaf spring, together with the generally U-shaped member is preferable for manufacturing reasons, and because of the added resiliency in the leaf spring which permits it to absorb and to dampen the severest action due to any extreme vibration set up by rotation of the out-of-balance rotor. For most purposes, therefore, the complete spring assembly is preferable, which not only improves the screen action but reduces the amount of vibration transmitted to the supporting structure.

In considering the general applicability of the screen, it should be kept in mind that the weight of the screen frame as a whole is mounted entirely upon the leaf springs at each side of the frame, which largely prevent the transmission of vibration to the screen base 1, while providing a very satisfactory vibration of the screen. I find it practical to position the vibrating member over the center of the support of the screen, although this may be varied, and otherwise located. I also find it important to employ a counterweighted or unbalanced rotating member to impart vibration to the screen box as a whole, which member is preferably adjustable in such fashion as to permit a variation or control of the amplitude of vibration given to the screen by rotation of the unbalanced member. Thus, by employing an unbalanced rotor having a fixed eccentric portion 13a and adjustable eccentric portions 13b, I can adjust the eccentricity or the throw of 13b to suit the particular springs employed, or material screened, or both, so that the springs will give the required vibration for the particular job or material.

As the various drawings show, I may considerably vary the shape and the disposition of the springs and the details of the securing means. I find the form shown in Figures 1 and 2 satisfactory, and in connection with them employ an arcuately recurved end portion for the top leaf 57, which arcuately recurved end portion terminates in a horizontal portion 59 parallel with the body of the spring. Preferably such a portion is employed at each end of the spring. The clamping brackets 61 and 62 provide a firm abutment and the spring end 59 is clamped between the bracket member 61 and the clamp blade 64.

By employing a single bend or turn of spring stock at each end of the spring body, I provide a spring member which permits the rotation of the rotor to impart its centrifugal vibration uniformly to the spring as a whole, with no dead spots and little variation in the amplitude of the vibration of the individual screen cloth areas. I also find that the employment of this type of spring greatly reduces the loss of efficiency which is inherent in the employment of the spirally coiled springs, or in the employment of rubber bushings or other flexure permitting means which, unfortunately, are ideally adapted to dampen vibration. The absorption of vibration in rubber bushings, spiral or coil springs, and the like is a waste which is avoided in my form of screen.

I may employ two quarter-elliptical springs at each side of the screen box. This may be useful in long screens and the modification is so clear as not to involve the necessity of separate illustration. Thus, in Figure 6, one is shown at each end of each side of the screen box. Any of the springs herein shown could be thus modified, with a quarter-elliptic spring at each corner of the box, mounted on the support 1, two on each side.

I claim:

1. In a vibratory screen, a base, a screen frame, and supporting means for the screen frame, including leaf springs interposed between the screen frame and the base, each said leaf spring including a longitudinally extending body portion and recurved leaf ends, including portions generally parallel with the leaf spring and means for attaching said parallel portions to the screen frame.

2. In a vibratory screen assembly, in combination, a screen box, a base, semi-elliptical leaf springs on either side of said screen box, said springs supporting said box and being mounted upon the base and secured at their outer ends to the screen box, said springs including generally U-shaped members comprising loops of approximately 180 degrees curvature, said U-shaped members being secured to the screen box at their free ends, and means for vibrating the screen box.

3. In a vibratory screen assembly, in combination, a screen box, a base, leaf springs on either side of said screen box, said springs supporting said box and being mounted upon the base and secured at their outer ends to the screen box, said springs including generally U-shaped members comprising loops of approximately 180 degrees curvature, said U-shaped members being secured to the screen box at their free ends, and means for vibrating the screen box, each said U-shaped member being integral with a spring leaf.

HARRY L. STRUBE.